W. H. L. KING.
Wheel-Cultivator.

No. 50,141.  Patented Sept. 26. 1865.

Witnesses:  Inventor:

UNITED STATES PATENT OFFICE.

W. H. L. KING, OF PRINCETON, IOWA.

IMPROVEMENT IN CULTIVATORS.

Specification forming part of Letters Patent No. 50,141, dated September 26, 1865.

*To all whom it may concern:*

Be it known that I, W. H. L. KING, of Princeton, in the county of Scott and State of Iowa, have invented a new and Improved Cultivator; and I do hereby declare that the following is a full, clear, and exact description thereof, which will enable those skilled in the art to make and use the same, reference being had to the accompanying drawings, forming part of this specification, in which—

Figure 1:
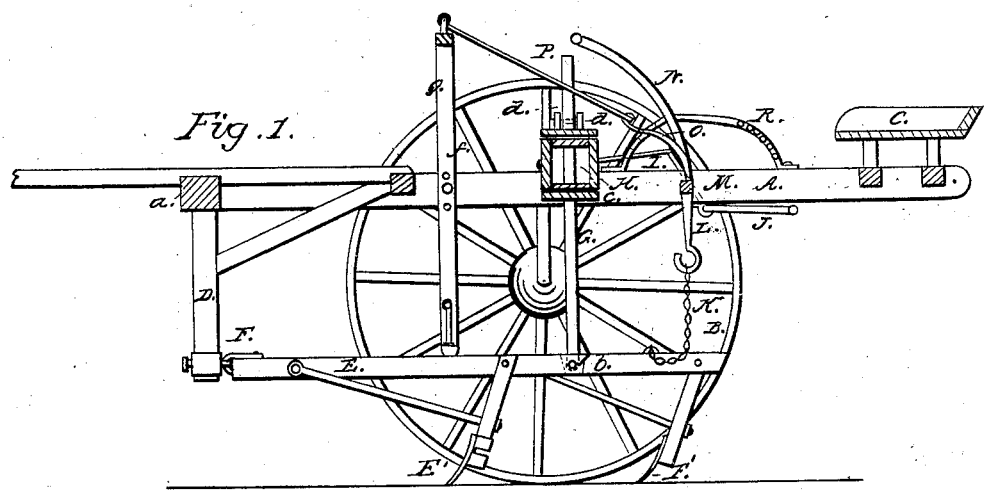
Figure 2:
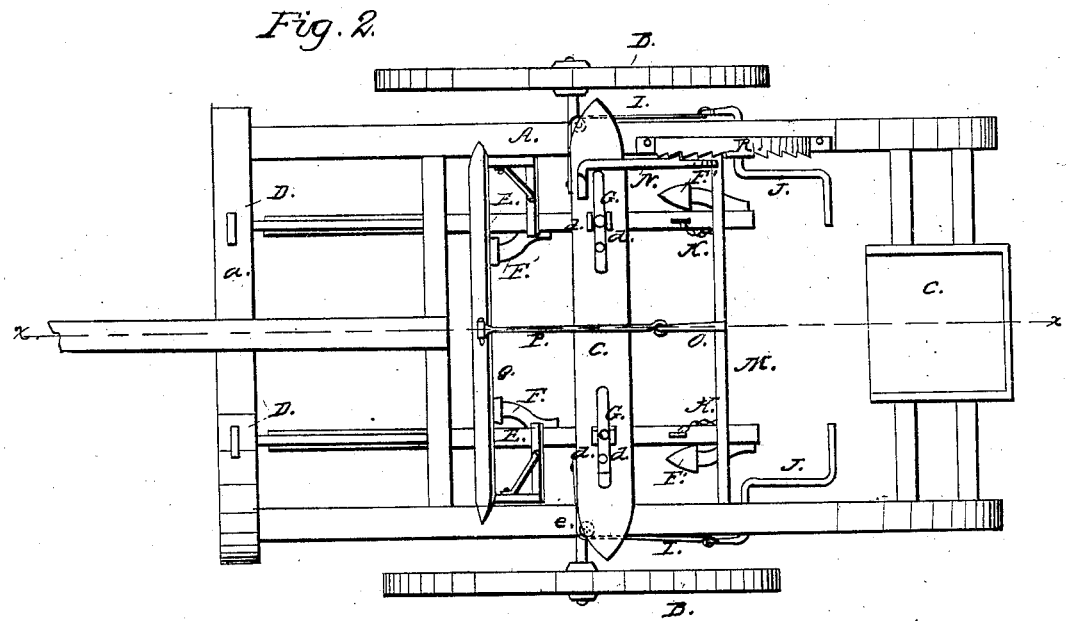

Figure 1 is a side sectional view of my invention, taken in the line $xx$, Fig. 2; Fig. 2, a plan or top view of the same.

Similar letters of reference indicate corresponding parts.

This invention relates to a new and improved cultivator of that class which are provided with laterally and vertically adjustable plows, in order to admit of the latter being moved to conform to the sinuosities of the rows of plants, and also to raise and pass over them.

The object of the invention is to obtain a simple device for the purpose specified, and one which may be readily operated or manipulated by the driver.

A represents the frame of the device, which is of rectangular form, and is mounted on two wheels, B B, and has a driver's seat, C, on its rear end.

At the front part of the frame A there are two pendants, D D, to the lower ends of which the front ends of the two plow-beams E E are connected by universal joints F. These pendants may be attached to the front cross-piece, $a$, of the main frame in such a manner as to be capable of being adjusted nearer together or farther apart, as may be desired.

The plow-beams have each two plows, F', attached to them in the usual way, and each beam has an upright, G, attached to it by a pivot, $b$, said uprights passing through a slide, H, which is fitted between cross-bars $c$ $c$ on the frame A, the cross-bars having oblong slots made in them for the uprights G to pass through and admit of the slide H moving to the right and left. The upper parts of the uprights G have rollers $d$ connected to them, which rest on the upper cross-bar, $c$, and support the plows at the proper or desired height, the rollers $d$ being capable of being adjusted higher or lower on the uprights G, as occasion may require.

The slide H has a strap or cord, I, attached to each end of it, and these straps or cords pass around pulleys $e$ $e$ at the sides of the frame A, and are connected to foot-levers J J, one at each side of the frame A. These foot-levers are operated by the driver from his seat C, and the plows moved laterally thereby, so as to conform to the sinuosities of the rows of plants.

The rear parts of the plow-beams E E are connected by chains K K to arms L L, which project from a shaft, M, in the frame A, said shaft having a hand-lever, N, attached to it, and also an arm, O, which is connected by a rod, P, with a frame, Q, which works on pivots $ff$ in the frame A. This frame Q, when the plows are at work, is about in a horizontal position and holds the plow-beams E E down; but when the lever N is drawn back for the purpose of raising the plows out of the ground the lower part of the frame Q, in consequence of being connected to the shaft M, as shown, is thrown forward to admit of the plow-beams rising. The lever N is retained at any desired point within the scope of its movement by means of a rack-bar, R, on the frame A, with which bar the lever N engages.

From the above description it will be seen that the plows are under the complete control of the operator, and may be adjusted with the greatest facility so as to conform to the sinuosities of the rows of plants, or be raised vertically when not designed for work, as in drawing the machine from place to place, turning at the ends of rows, or in passing over obstructions.

Having thus described my invention, I claim as new and desire to secure by Letters Patent—

1. The plow-beams E E, attached to the frame A by means of the universal joints F, in combination with the uprights G G and slide H and foot-levers J J, all arranged to operate in the manner substantially as and for the purpose set forth.

2. The pivoted frame Q, connected to the shaft M, substantially as shown, when used in connection with the plow-beams E E, connected to the shaft M, and all arranged substantially as and for the purpose specified.

W. H. L. KING.

Witnesses:
ARTHUR PATTERSON,
JOHN REED.